United States Patent
Singh et al.

(10) Patent No.: US 9,873,293 B2
(45) Date of Patent: Jan. 23, 2018

(54) INDIRECT TIRE WEAR STATE PREDICTION SYSTEM AND METHOD

(71) Applicant: The Goodyear Tire & Rubber Company, Akron, OH (US)

(72) Inventors: Kanwar Bharat Singh, Stow, OH (US); Marc Engel, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 196 days.

(21) Appl. No.: 14/918,928

(22) Filed: Oct. 21, 2015

(65) Prior Publication Data

US 2017/0113494 A1 Apr. 27, 2017

(51) Int. Cl.
 B60C 11/24 (2006.01)
 B60C 23/04 (2006.01)
 G01S 19/24 (2010.01)
 G01M 17/02 (2006.01)

(52) U.S. Cl.
 CPC ........ *B60C 11/246* (2013.01); *B60C 23/0415* (2013.01); *B60C 23/0486* (2013.01); *G01M 17/02* (2013.01); *G01S 19/24* (2013.01)

(58) Field of Classification Search
 CPC ...... F16C 29/008; G01M 17/02; G01S 19/24; B60C 23/0415; B60C 23/0486; B60C 11/246
 USPC ........................ 73/8, 146; 340/438; 701/29.1
 See application file for complete search history.

(56) References Cited

U.S. PATENT DOCUMENTS

| | | | |
|---|---|---|---|
| 8,886,395 B2 | 11/2014 | Singh et al. | |
| 2010/0238007 A1* | 9/2010 | Kikuchi | B60C 23/04 340/438 |
| 2014/0114558 A1 | 4/2014 | Singh et al. | |
| 2014/0278040 A1 | 9/2014 | Singh et al. | |
| 2015/0040656 A1 | 2/2015 | Singh et al. | |
| 2015/0057951 A1* | 2/2015 | Stalnaker | B60C 99/006 702/34 |
| 2015/0174967 A1 | 6/2015 | Lehmann et al. | |

FOREIGN PATENT DOCUMENTS

EP  3028909 A1  6/2016

OTHER PUBLICATIONS

EPO Search Report received by Applicant on May 19, 2017.

* cited by examiner

*Primary Examiner* — Hezron E Williams
*Assistant Examiner* — Suman K Nath
(74) *Attorney, Agent, or Firm* — Edward T. Kennedy

(57) ABSTRACT

A tire wear state estimation system estimates forces and sliding velocity generated in a tire contact patch, determines frictional energy from the tire force and sliding velocity, and generates an estimate of tire wear state based upon the frictional work done by the tire. A tire wear estimate, pursuant to the system and methodology, is made by determining the amount of frictional work performed by the tire through the integrated use of tire-mounted, GPS sourced, and vehicle-mounted sensor information.

18 Claims, 12 Drawing Sheets

Longitudinal Force (Fx)

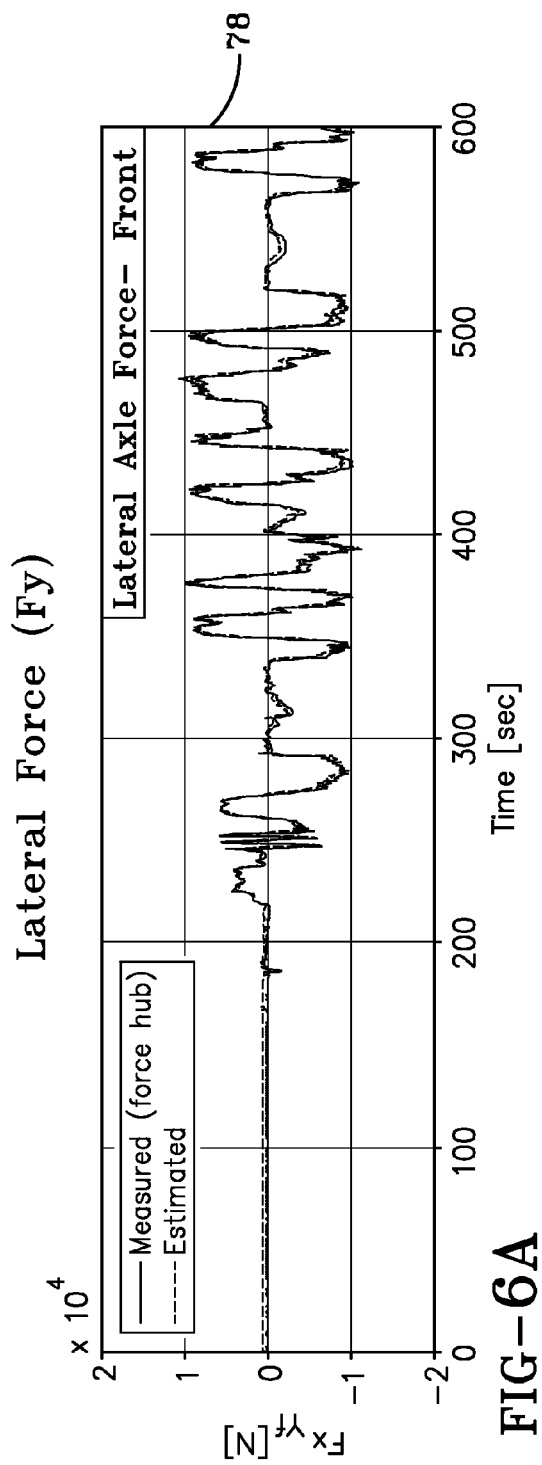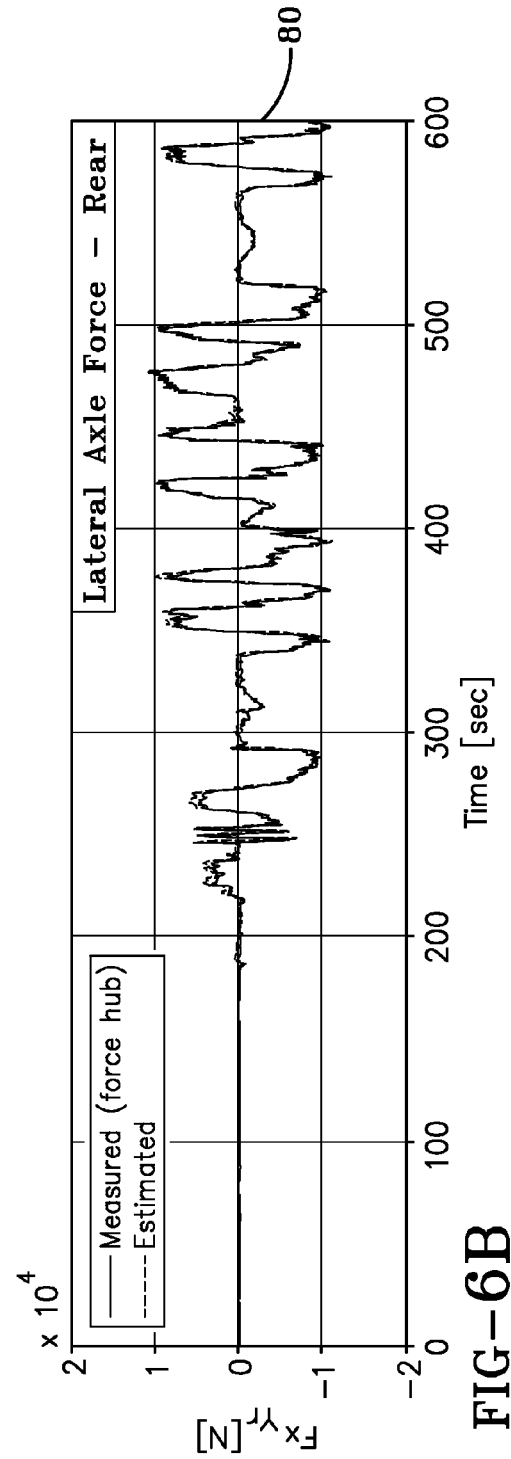
FIG-6A
FIG-6B

Identifying the Sliding Zone

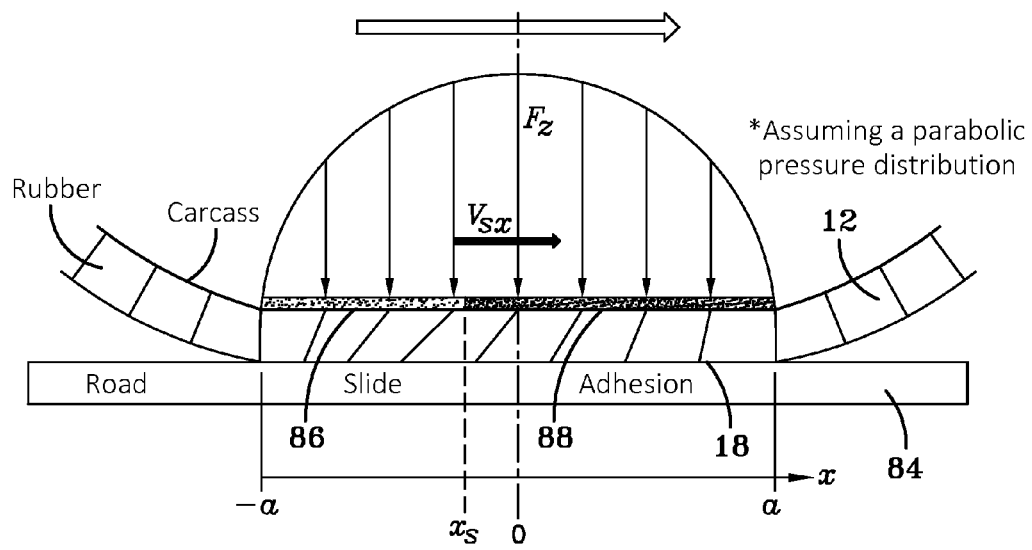

$$F_{total} = F_{adhesion} + F_{sliding}$$

$$F_x = F_{ax} + F_{sx}$$

$$F_x = F_x * \underbrace{(1 - 3\psi^2 + 2\psi^3)}_{\text{Adhesion factor}} + F_x * \underbrace{(3\psi^2 - 2\psi^3)}_{\text{Sliding factor}}$$

Where $\psi$ is the normalized slip with the respect to the limit slips $$\psi = \sqrt{\left(\frac{\lambda}{\lambda_{max}}\right)^2 + \left(\frac{\alpha}{\alpha_{max}}\right)^2} \quad 0 \leq \psi \leq 1$$

FIG-8B

Estimating the Sliding Friction Energy

- The frictional energy (Ex,y) is calculated based on the sliding forces and sliding velocities of the tire contact patch.

- The sliding forces are estimated using the expressions:

$$F_{sx} = F_x * (3\psi^2 + 2\psi^3) \qquad F_{sy} = F_y * (3\psi^2 - 2\psi^3)$$

Where $\psi$ is the normalized slip with the respect to the limit slips $$\psi = \sqrt{\left(\frac{\lambda}{\lambda_{max}}\right)^2 + \left(\frac{\alpha}{\alpha_{max}}\right)^2} \qquad 0 \leq \psi \leq 1$$

Fx and Fy are the longitudinal and lateral tire forces estimated under combined slip conditions

- The sliding velocities are estimated using the expressions:

$$V_{sx} = V_x - r\omega \qquad V_{sy} = V_y = V_x \tan\alpha$$

- Hence the friction energy is given by the expression:

$$E_x = F_{sx} V_{sx} \qquad E_y = F_{sy} V_{sy}$$

90

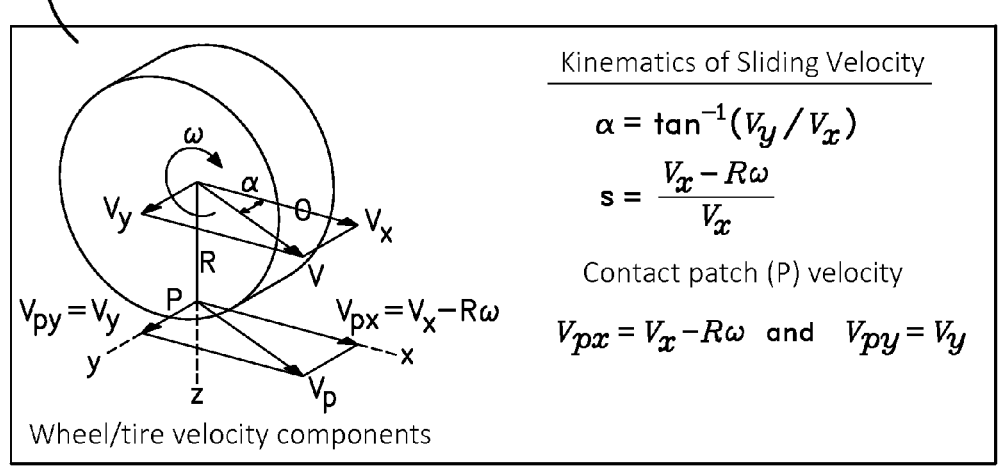

Kinematics of Sliding Velocity $$\alpha = \tan^{-1}(V_y / V_x)$$

$$s = \frac{V_x - R\omega}{V_x}$$

Contact patch (P) velocity $$V_{px} = V_x - R\omega \quad \text{and} \quad V_{py} = V_y$$

Wheel/tire velocity components

FIG-9

INDIRECT TIRE WEAR STATE PREDICTION SYSTEM AND METHOD

FIELD OF THE INVENTION

The invention relates generally to tire monitoring systems for collecting measured tire parameter data during vehicle operation and, more particularly, to a system and method for estimating tire wear state based upon such measurements in combination with vehicle-based sensor-measured data.

BACKGROUND OF THE INVENTION

Tire wear plays an important role in vehicle safety, reliability, and performance. Tread wear, referring to the loss of tread material, directly affects such vehicle factors. Tread wear may be monitored and measured through placement of wear sensors in the tire tread. Reliability of the direct wear measurement of tire tread, however, can be problematic due to issues such as sensor failure, difficulty in sensor integration into a tire tread and difficulty in retrieval of sensor data over the lifetime of a tire tread.

It is accordingly desirable to achieve a system and method that accurately and reliably measures tire wear state and communicates wear state to vehicle operators and/or to vehicle operating systems such as braking and stability control systems.

SUMMARY OF THE INVENTION

According to one aspect of the invention, a tire wear state estimation system for a tire supporting a vehicle includes one or more tire-mounted device(s) operable to supply tire-specific information affecting tire contact patch dynamics, one or more inertial measurement unit(s) operable to supply sliding velocity information from a tire contact patch formed by the one tire rolling over a ground surface, a friction work estimator operable to calculate a friction work estimate done by the tire from the tire-specific information and the sliding velocity information and a tire wear rate estimator operable to generate a tire wear rate estimation from drawing a proportional correlation between the tire wear rate estimation and the calculated friction work estimate.

In another aspect, the tire wear rate estimator employs in the tire wear rate estimation externally supplied abrasion-impacting information influencing abrasion characteristics of a material composing the tire.

Pursuant to a further aspect, the friction work estimator includes a tire force estimator and sliding velocity estimator operable to respectively generate a tire force estimate and a sliding velocity estimate for the tire contact patch from the tire-specific information and the sliding velocity information.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for mean square error, the error between and a measured signal and an estimated signal which the Kalman filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is power spectral density (a technical name synonymous with FFT (fast fourier transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The drawings show the schematic of the subject system and method and experimental validation of the system and method performance.

DETAILED DESCRIPTION OF THE DRAWINGS

Figure 1:
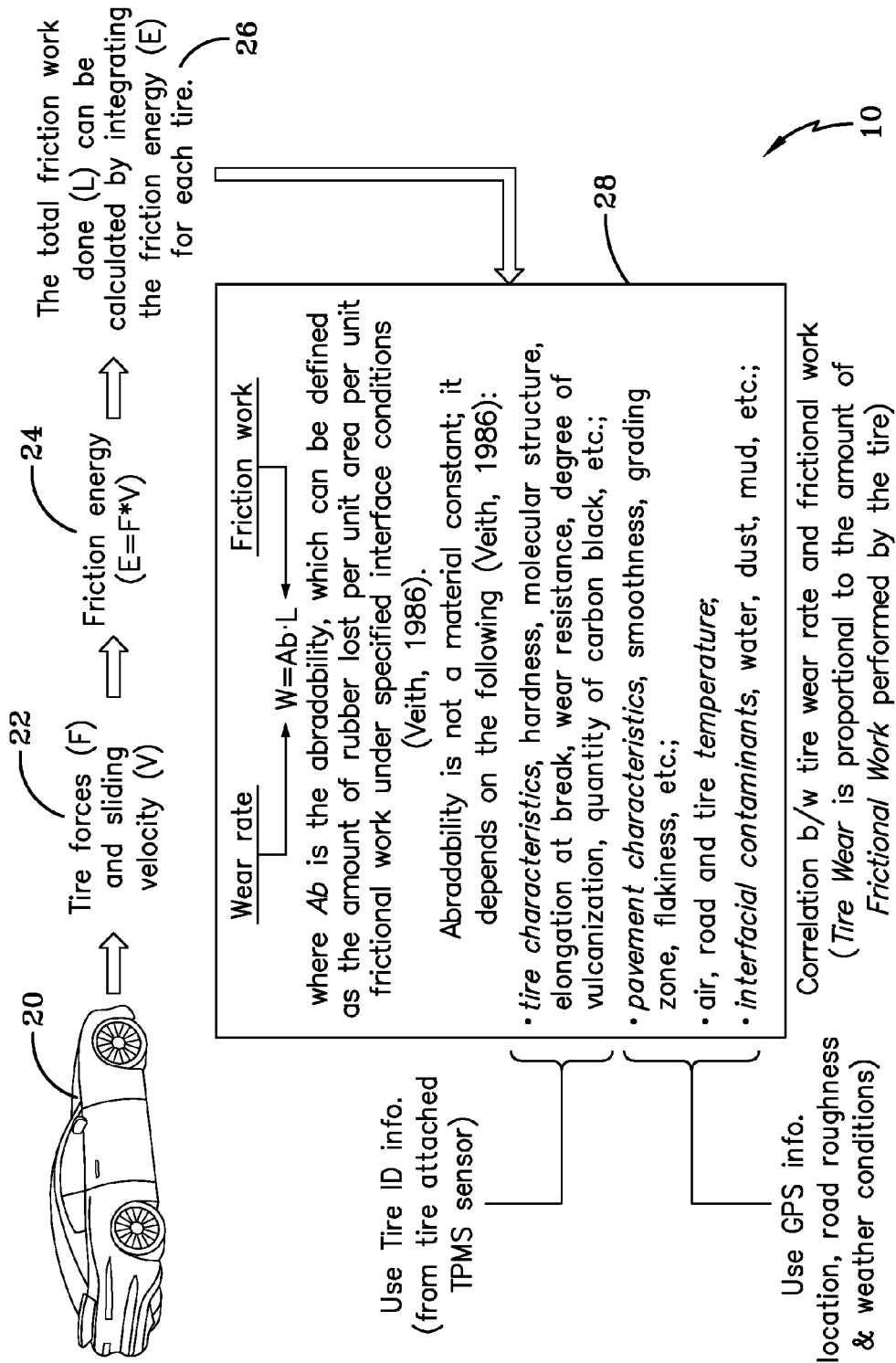

The invention will be described by way of example and with reference to the accompanying drawings in which:

FIG. 1 is a flow chart of the subject tire wear estimation scheme.

Figure 2:
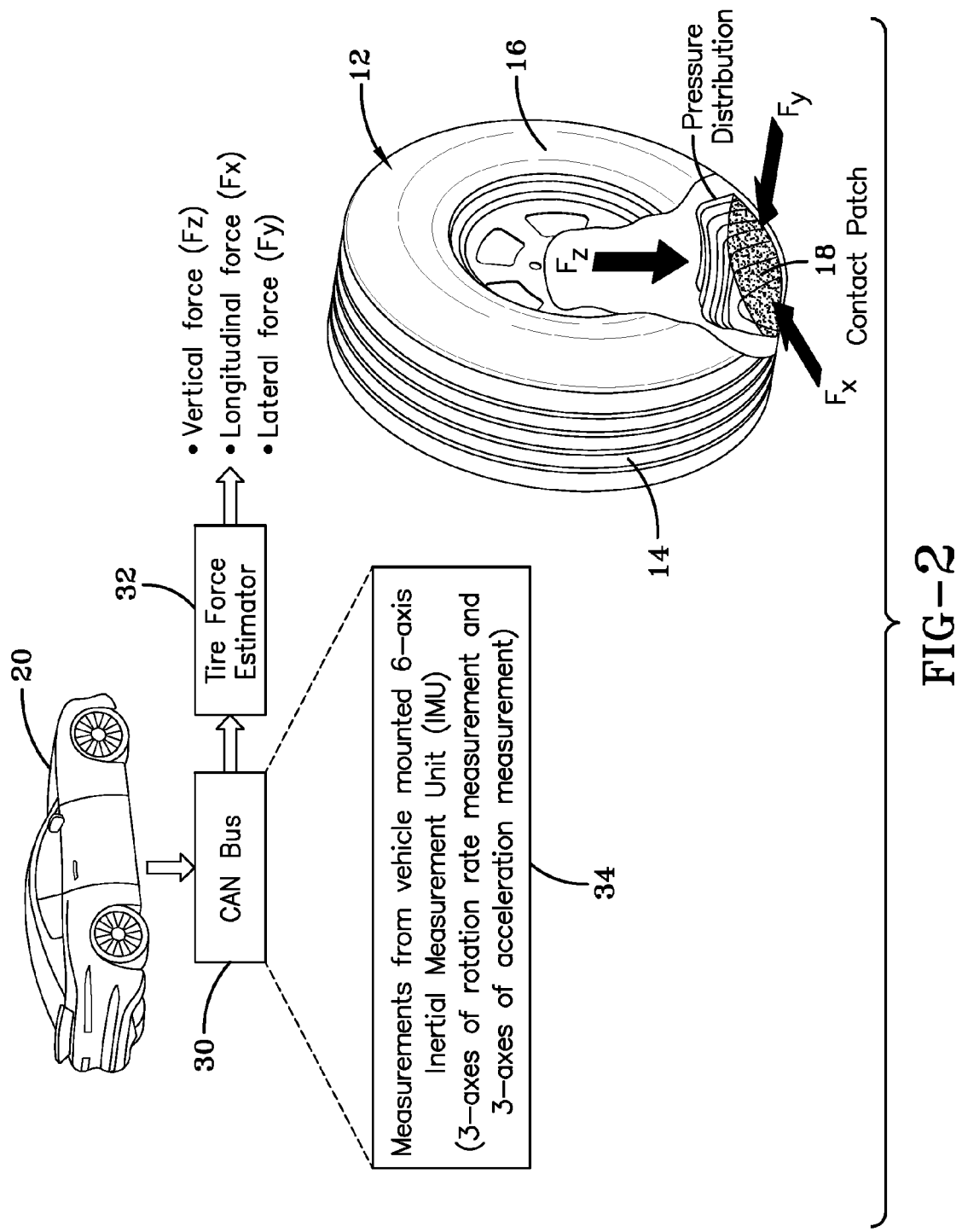

FIG. 2 is a flowchart demonstrating the estimation of tire forces.

Figure 3:
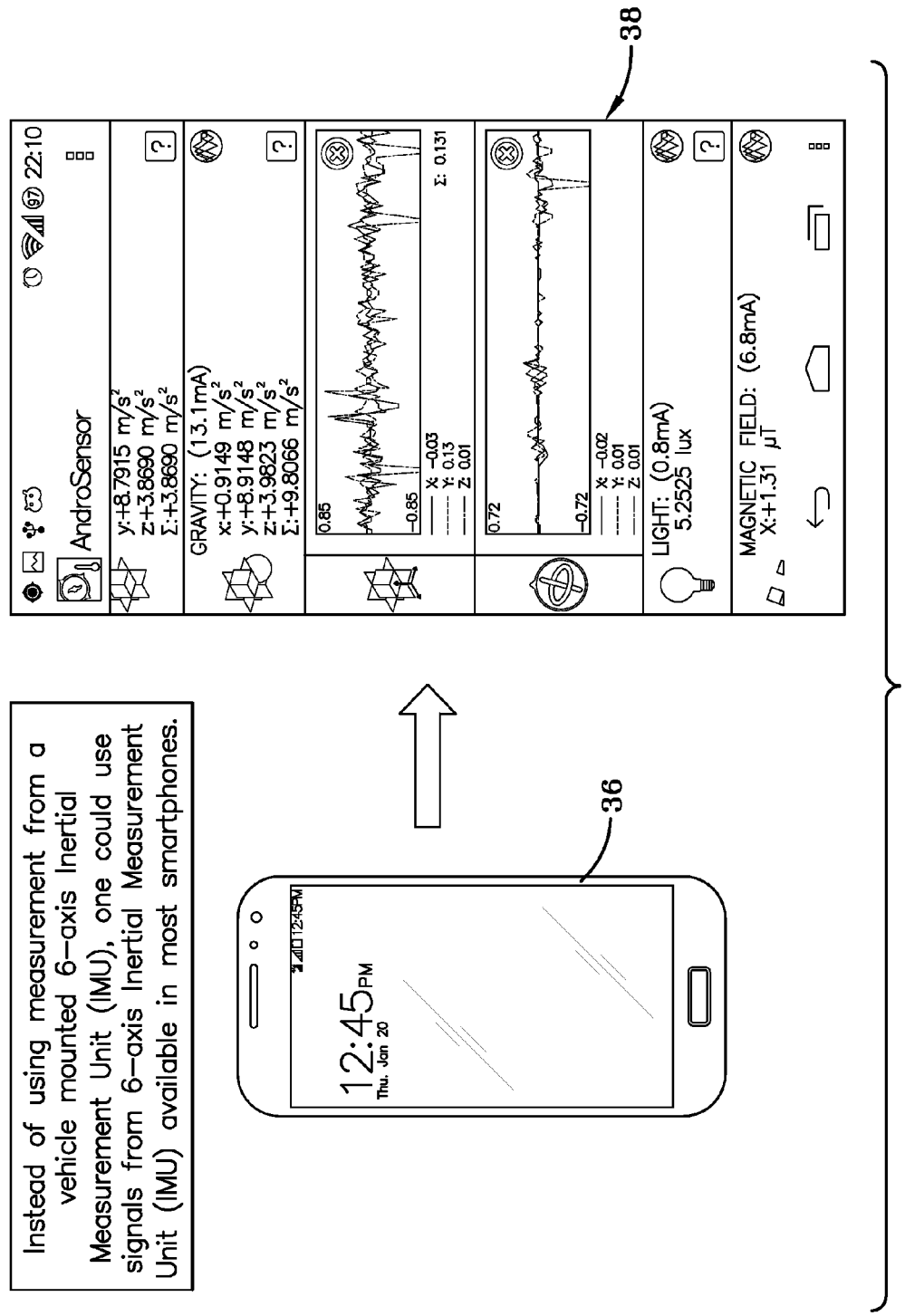

FIG. 3 is a representation on the use of a smartphone to generate inertial measurements in the tread wear estimation system and method.

Figure 4:
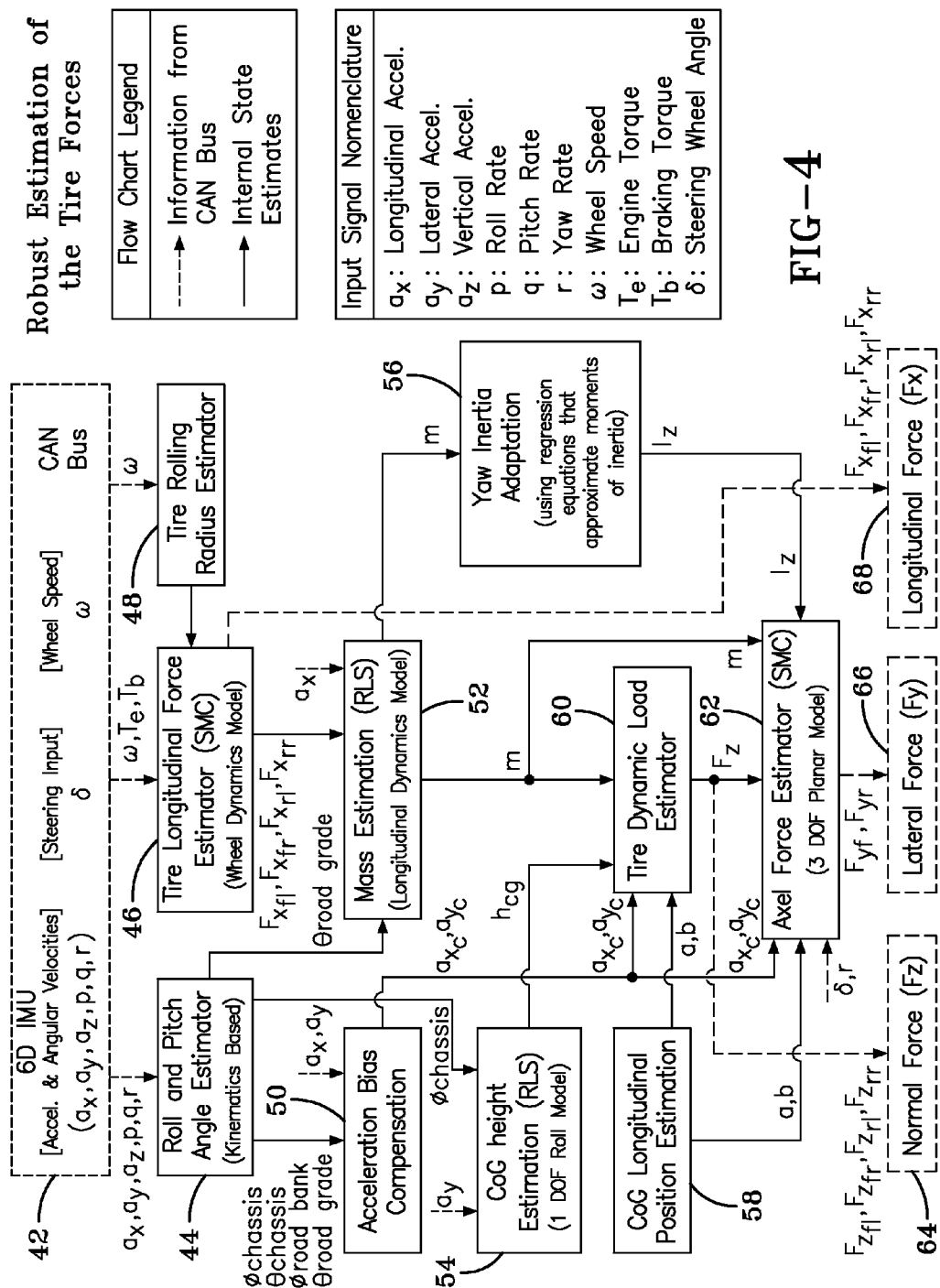
Figures 5A, 5B, 5C, 5D:
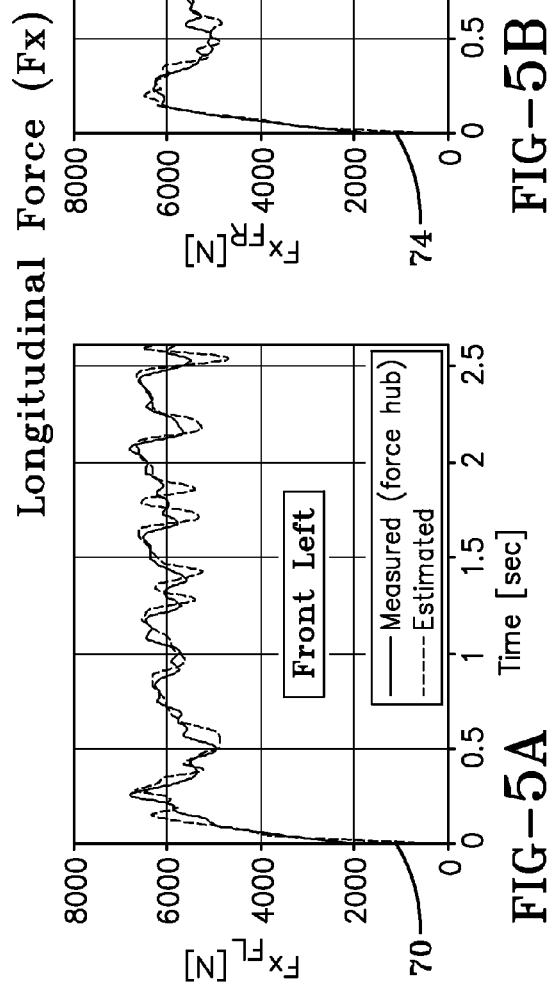

FIG. 4 is a system diagram showing the robust estimation used to estimate the tire forces.

FIGS. 5A, 5B, 5C and 5D are graphs showing experimental verification of the tire forces estimation, graphing measured vs. estimated longitudinal force for four vehicle tire locations.

FIGS. 6A and 6B are graphs of front and rear lateral force comparing actual vs. estimated using the subject force estimation scheme.

Figure 7:
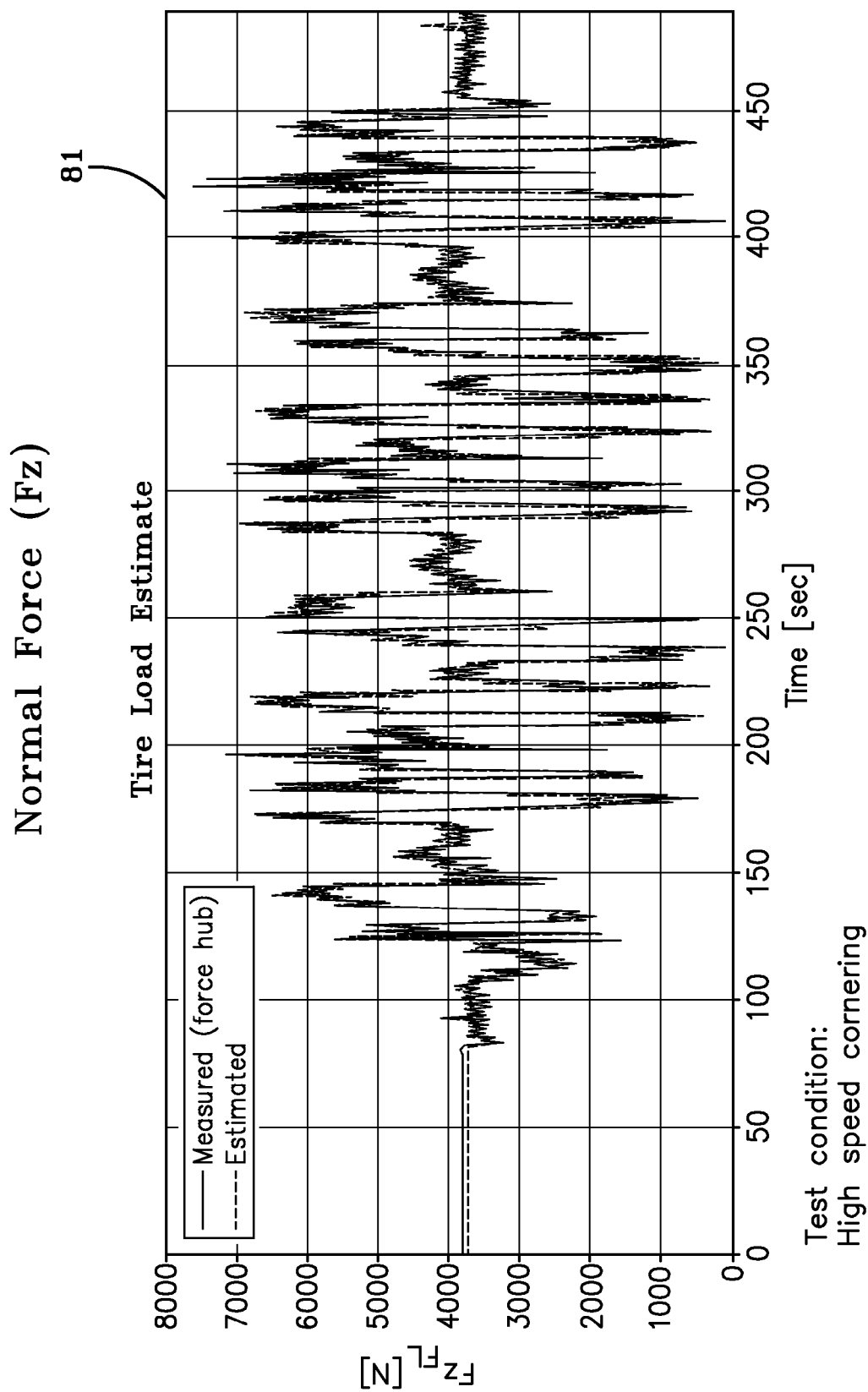

FIG. 7 is a graph comparing normal force actual vs. estimated using the force estimation scheme.

Figure 8A:
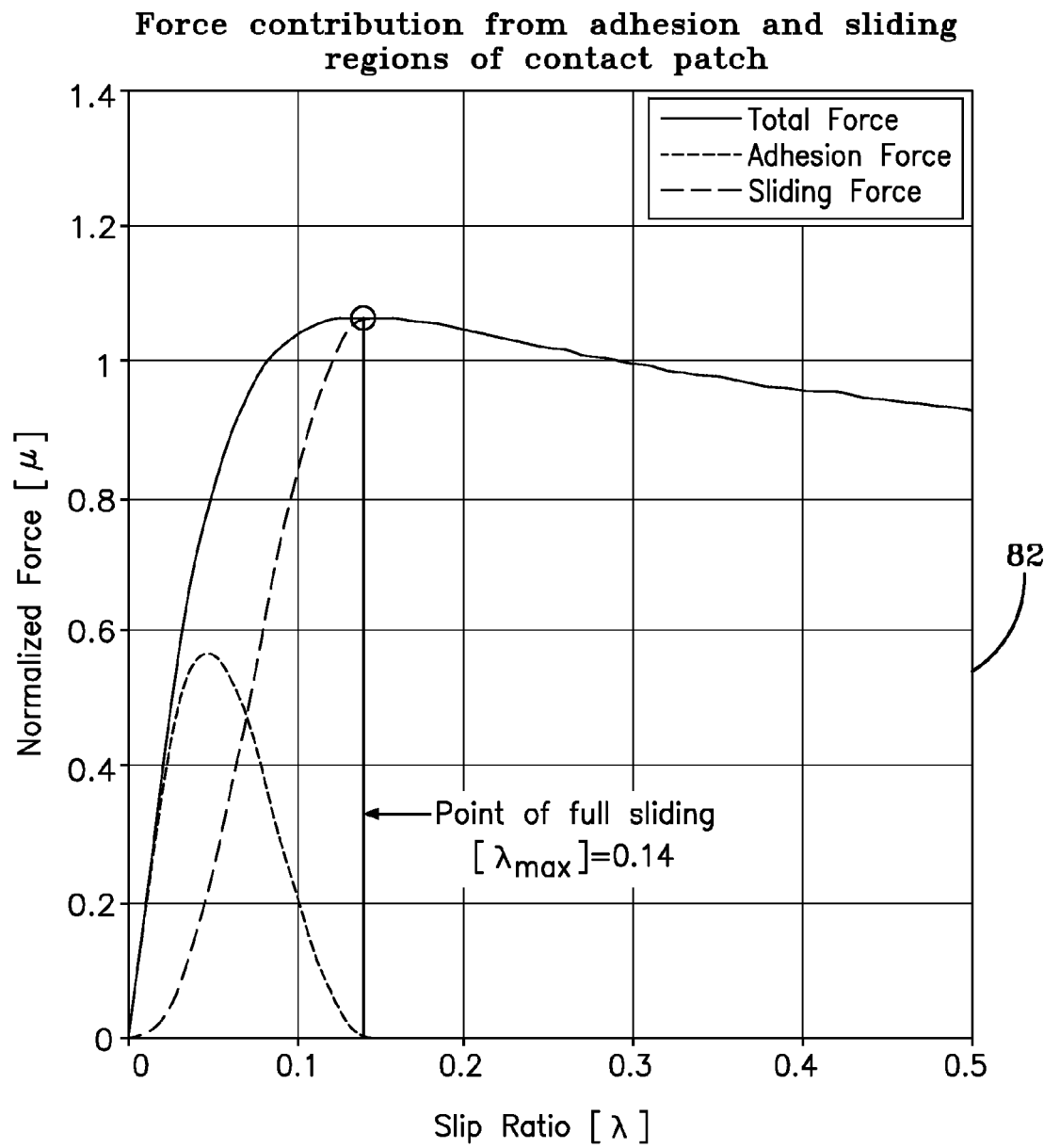

FIG. 8A are graphs of normalized force vs. slip ratio demonstrating an identification of a sliding zone and showing total force, adhesion force and sliding force graphs.

FIG. 8B is a schematic representation showing identification of the sliding zone within a tire contact patch and associate algorithms for determination of the tire force estimation.

FIG. 9 is a schematic representation of the kinematics of sliding velocity used in the subject system and associate algorithms for estimating the sliding friction energy.

Figure 10:
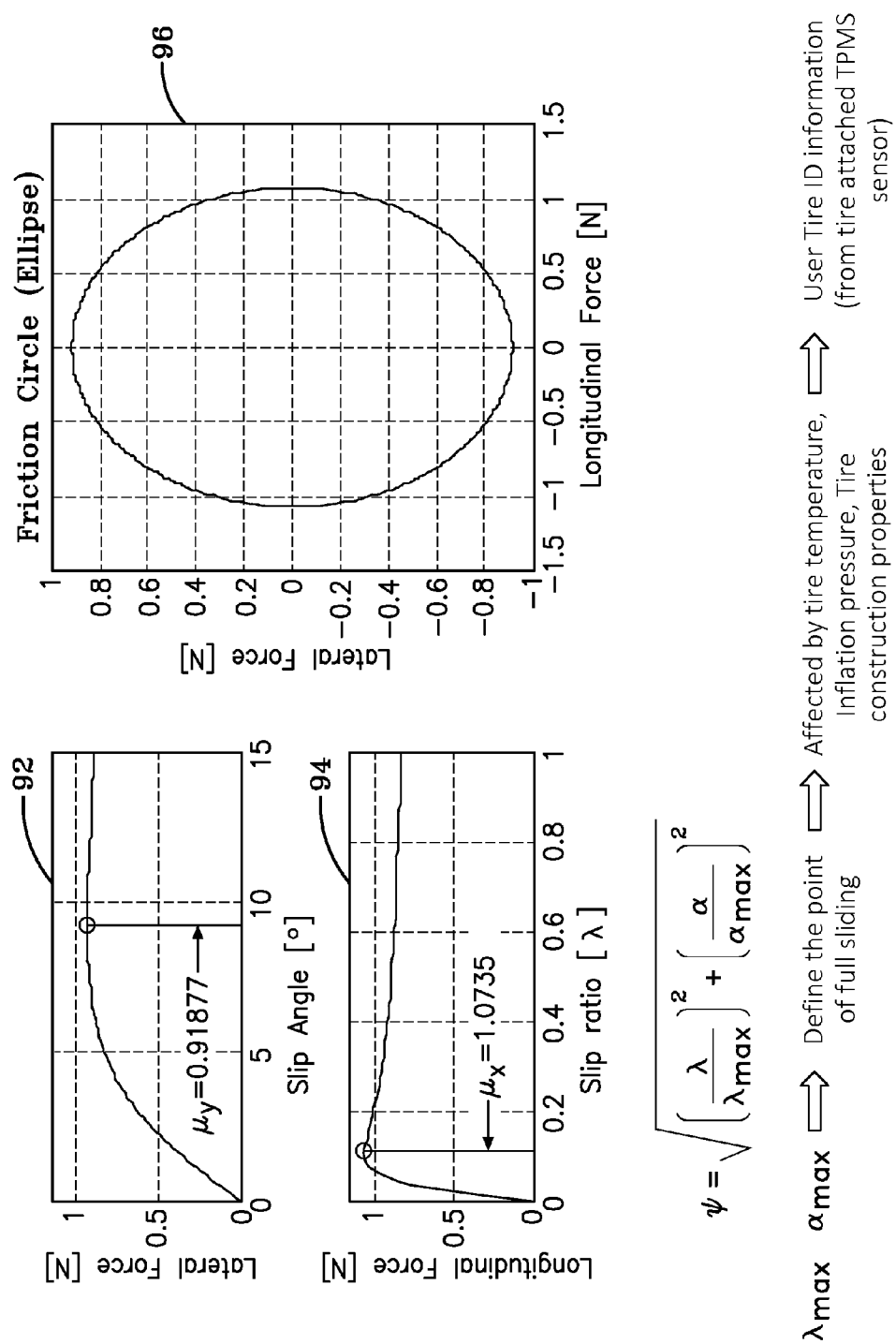

FIG. 10 are graphs showing lateral force and longitudinal force vs. slip ratio and load force vs. longitudinal force friction circle compensated for the influence of tire operating conditions.

Figure 11:
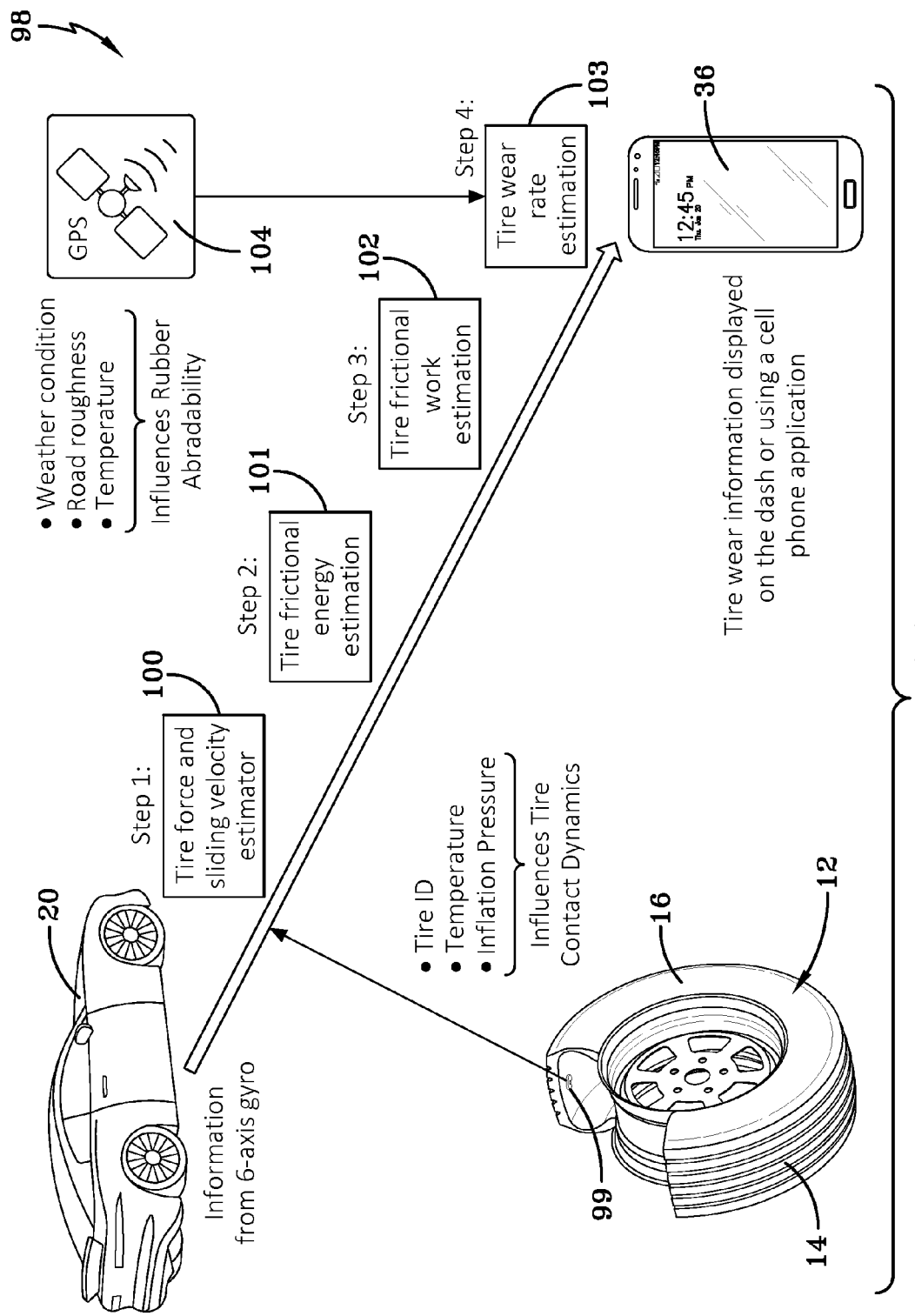

FIG. 11 is a flow chart showing the overall tire wear estimation system and method.

DETAILED DESCRIPTION OF THE INVENTION

Referring to FIGS. 1 and 2, a tire wear estimation system 10 is shown for estimating tread wear in a vehicle tire 12.

The tire 12 is of a conventional construction having a circumferential tread region 14 and sidewalls 16. The tire 12 creates a contact patch 18 as it rolls, with pressure being distributed across the contact patch, resulting in tire forces $F_x$, $F_y$ and $F_z$. The tire 12 is one of several tires supporting a vehicle 20. For the purposes of the subject explanation, analysis of a single tire will be made, it being understood that a similar analysis is contemplated for each tire of a vehicle in order to assess tire tread wear for each tire. In addition, it will be appreciated that while the vehicle 20 is depicted as a passenger vehicle, the subject system and method for analyzing tire tread wear is equally applicable for other types of vehicles such as commercial trucks, etc.

The system 10 and method employed therein uses tire-specific sensor information and vehicle-based inertial sensor information to determine tire forces 22 (F) and sliding velocity (V). The product of F and V calculates friction energy 24 (E). The friction energy 24 is then used to calculate total friction work (L) 26 by integrating the friction energy (E) for each tire. Wear rate (W) is determined as the product of friction work L and an abradability factor Ab. Ab is defined in the industry as the amount of rubber lost per unit area per unit of frictional work under specified interface conditions. However, abradability Ab is not a material constant, but rather depends on tire characteristics such as hardness, molecular structure elongation at break, wear resistance, degree of vulcanization, quantity of carbon black, etc. The subject system uses one or more TPMS sensor(s) and tire identification transponder (tire ID) attached to each tire to gather certain tire-based information such as tire air pressure and tire temperature, as well as a transponder by ID number. The tire-based sensor and tire ID transponder information (collectively referred to herein as "tire-specific information") are transmitted from each of the tires to a remote processor that conducts the calculations necessary to compute tire forces and sliding velocity 22, the friction energy 24 and total friction work L.

From the tire ID, processor consults a pre-constructed database to determine the tire-specific characteristics bearing on abradability, such as those listed above and in FIG. 1. This tire-specific information collectively is used to determine abradability factor Ab as defined above.

In addition to tire-specific information above discussed, abradability factor Ab changes as the result of ambient factors such as pavement characteristics (e.g. smoothness, grading zone, flackiness, etc. of the road surface), ambient air and road temperature and the presence and concentration of interfacial contaminants such as water, dust, mud, etc. on the road surface. Such information, referred to collectively herein as "abrasion-impacting information" may be sourced to the processor from a global positioning system (GPS) transmission and used with the tire-specific information to determine abradability Ab from a pre-construction database.

From the foregoing and the relationship W=Ab*L, it will be appreciated that the subject tread wear system and method uses the correlation between the tire wear rate and the frictional work calculated. Stated summarily, tire wear concluded by the subject system and method is derived from the proportional correlation between tread wear and frictional work performed by the tire.

As seen in FIG. 2, the tire force estimator 32 used to estimate tire forces (F) may be obtained in a preferred embodiment from vehicle-based inertial sensor mounted to the hub of the vehicle 20 supporting the tire. Commercially available, hub-mounted, inertial sensors are commonly placed into vehicles and are referred herein as an "inertial measurement unit". The inertial measurement unit (IMU)

provides via the vehicle's CAN-bus a 3-axes of rotation rate measurement and a 3-axes of acceleration measurement 34. From such measurements, as described following, the tire force estimator 32 calculates tire forces F, specifically vertical force (load) ($F_z$), longitudinal force ($F_x$) and lateral force ($F_y$).

Preferably, an estimation system and method will be employed to generate the requisite tire forces. Pending U.S. patent application Ser. No. 14/879,457, filed Oct. 9, 2015 and entitled ROBUST TIRE FORCES ESTIMATION SYSTEM teaches a system for estimating tire forces based upon tire sensor-based measurements in combination with vehicle-based sensor measured data. Pending U.S. patent application Ser. No. 14/879,611, filed Oct. 9, 2015 and entitled METHOD FOR ESTIMATING TIRE FORCES FROM CAN-BUS ACCESSIBLE SENSOR INPUT teaches a method for estimating tire forces from CAN-Bus accessible sensor inputs. These applications are hereby incorporated herein in their entities to explain a system and method for deriving estimated tire forces used in the subject system.

The IMU used in the subject system may, as discussed above be generated from commercially available hub mounted sensors, referred to as a "vehicle sensor-based" IMU. Alternatively, or in conjunction with, the vehicle sensor-based IMU signals from a 6-axis inertial measurement unit or IMU available in most smartphones may be used. FIG. 3 illustrates a typical smartphone 36 and typical inertial sensor-based inertial measurements 38 of X, Y and Z.

FIG. 4 is a system flow chart diagram showing the robust estimation used to estimate the tire forces. Broken lines in FIG. 4 represent information from the vehicle CAN-bus while solid lines represent internal state estimates. The nomenclature for input signals is shown in FIG. 4.

For the implementation of the robust tire force estimation method, five vehicle parameters are required for the implementation of a robust tire force estimation scheme and are provided by the following with numerical reference to the flow chart of FIG. 4.

Tire rolling radius (48). Tire rolling radius may be obtained through the estimation of tire effective radius using information from a tire-attached TPMS module. U.S. Patent Publication No. 2014/0114558, filed Oct. 19, 2012, published Apr. 24, 2014, and entitled VEHICLE WEIGHT AND CENTER OF GRAVITY ESTIMATION SYSTEM AND METHOD teaches an acceptable approach and is incorporated by reference herein in its entirety.

Vehicle Sprung Mass (52): Vehicle sprung mass (m) may be obtained through an approach set forth in pending U.S. Pat. No. 8,886,395, issued Nov. 11, 2014, and entitled DYNAMIC TIRE SLIP ANGLE ESTIMATION SYSTEM AND METHOD hereby incorporated herein by reference in its entirety.

Vehicle Longitudinal Center of Gravity (CoG) Position (58). Vehicle longitudinal CoG position (a,b) may be obtained through an approach set forth in U.S. Pat. No. 8,886,395 issued Nov. 11, 2014, and entitled DYNAMIC TIRE SLIP ANGLE ESTIMATION SYSTEM AND METHOD hereby incorporated herein by reference in its entirety.

Yaw Moment of Inertia (56). Yaw moment of inertia ($I_z$) may be estimated using regression equations that approximate moment of inertia as instructed in the article "Estimation of Passenger Vehicle Inertial Properties and Their Effect on Stability and Handling" No. 2003-01-0966; *SAE Technical Paper*, 2003, hereby incorporated herein by reference in its entirety.

CoG Height Position (54). Vehicle height CoG position ($h_{cg}$) may be obtained. U.S. Patent 8 Patent Publication No. 2014/0114558, filed Oct. 19, 2012, published Apr. 24, 2014, and entitled VEHICLE WEIGHT AND CENTER OF GRAVITY ESTIMATION SYSTEM AND METHOD teaches an acceptable approach and is incorporated by reference herein in its entirety.

A 6 axis IMU 42, obtained from CAN-bus vehicle sensor-based sensors or handheld smartphone, provides acceleration and angular velocities $a_x$, $a_y$, $a_z$ and sensors provide roll rate p, pitch rate q and yaw rate r. Steering wheel angle $\delta$ and wheel speed $\omega$ are further obtained via the vehicle CAN-bus from vehicle sensors. From the acceleration and angular velocities, using a kinematics-based roll and pitch estimator 44, chassis and road bank roll and pitch angles are estimated. The tire rolling radius is estimated from a tire rolling radius estimator 48 based on wheel speed. A tire longitudinal force estimator 46 estimates tire longitudinal forces from the wheel speed, engine torque and braking torque inputs through use of an SMC wheel dynamics model estimator. Longitudinal force ($F_x$) is derived at 68 from the tire longitudinal force Estimator 46.

An acceleration bias compensation 50 is made from the $a_x$, $a_y$ and the chassis, road bank and road grade inputs. Mass estimation m is made from mass estimator 52 (RLS) based on a longitudinal dynamics model. From the mass estimation m, yaw inertia adaptation 56 is made using regression equations that approximate moment of inertia. A center of gravity CoG height estimation 58 (RLS) $h_{cg}$ is made using one DOF roll model 54 from the $a_y$ and chassis roll estimation. Acceleration bias inputs $a_{xc}$, $a_{yc}$, m, and $h_{cg}$ into a tire dynamic load estimator 60 yields load estimation $F_t$ and determines the vertical or normal load force ($F_t$) 64. Lateral force ($F_y$) 66 is determined from axel force estimator (SMC) using a 3 DOF planar model 62. The estimation of tire normal, lateral and longitudinal forces $F_z$ 64, $F_y$ 66 and $F_x$ 68 is thus robustly determined and dependently derived from information from the vehicle CAN-Bus and internal state estimates as seen in FIG. 4.

Results using the above force estimation are validated experimentally as seen from graphical comparisons of measured to estimation in FIGS. 5A through 5D, FIGS. 6A and 6B and FIG. 7. In FIGS. 5A through 5D, in graphs 70, 72, 74, 76 measured (force hub) vs. estimated longitudinal force (Fx) over time is plotted for the four tires of a vehicle. The test condition was high speed braking and the test vehicle was a Chevrolet Corvette. As seen, good correlation in the test results are demonstrated validating the subject longitudinal force estimation methodology. In FIGS. 6A and 6B, in graphs 78, 80, measured vs. estimated results in a high speed cornering test are shown for the front and rear axles. Again, good robust correlation is indicated in the estimation of lateral force using the FIG. 4 methodology. In FIG. 7, the graph 81 shows results from a high speed cornering test, plotting measured vs. estimated normal force ($F_z$). Again, robust and accurate correlation is indicated.

The subject invention methodology for estimation of tire wear takes into consideration that wear only happens in the sliding zone of the contact patch. Sliding results in heat build-up in the tire and wear (abrasion) with wear accelerated at higher temperatures. FIG. 8B depicts the sliding zone 86 and the adhesion zone 88 within a contact patch created by a tire 12 against a road surface 84. A parabolic pressure distribution is assumed. $F_{total}$ is equal to $F_{adhesion}$ plus $F_{sliding}$. In order to compute $F_z$, the adhesion factor and sliding factor indicated in the expression of FIG. 8B are used where $\psi$ is the normalized slip with respect to the limit slips.

The expression for ψ is as indicated. FIG. 8A is a graph 82 of normalized force vs. slip ratio showing total force, adhesion force and sliding force. The graph 82 shows force contribution from adhesion and sliding regions of the contact patch. The point of full sliding is identified as max and computes to a value of (0.14).

FIG. 9 explains the methodology in estimating the sliding friction energy. As summarized, the frictional energy ($E_x$, $E_y$) is calculated based on the sliding forces and sliding velocities of the contact patch. The subject system quantifies tire use by calculating the friction energy. Friction energy is determined using tire forces and sliding velocities in the contact patch. Friction energy is defined as the dot product between the tire force and sliding velocity vectors. Thus, the proposed methodology for predicting tire wear relies on being able to accurately estimate forces generated in the tire contact patch. FIG. 4 represents the methodology for a robust estimation of such tire forces.

The expressions for determining the sliding forces are as shown in FIG. 9 where w is the normalized slip with respect to the limit slips. $F_x$ and $F_y$ are the longitudinal and lateral tire forces estimated under combined slip conditions. Sliding velocities $V_{sx}$ and $V_{sy}$ are determined from the expressions shown and friction energy is then calculated from the expressions for $E_x$ and $E_y$. The kinematics of sliding velocity will be understood from the model 90 shown in FIG. 9, identifying the wheel/tire velocity components. Contact patch (p) velocity may be determined from the expressions shown.

The subject system and method also compensates for the influence of tire operating conditions on the tire tread wear. In FIG. 10, slip angle α vs. lateral force is graphed at 92 and slip ratio [λ] vs. longitudinal force is graphed at 94. The friction circle is an ellipse as indicated by the graph 96 of lateral force vs. longitudinal force. The expression for the normalized slip with respect to slip limits [ψ] is shown. It will be appreciated that $\lambda_{max}$ and $\alpha_{max}$ define the point of full sliding which is affected by tire temperature, inflation pressure and tire construction properties. Pursuant to the invention, such tire properties are determined in real time from tire devices mounted to the tire. Tire ID information obtained from a tire-mounted tire ID transponder affixed to each tire of a vehicle and from tire-attached pressure and temperature sensors (tire pressure monitoring system "TPMS").

FIG. 11 shows the estimation system diagram 98 used in estimating the wear state of a tire tread 14. The tire 12 is mounted to a vehicles and is of conventional construction having a tread region 14 and sidewalls 12. Information from a 6-axis gyro is obtained from either vehicle-mounted sensors or from a smartphone as explained previously. In addition, tire-mounted sensors are mounted to each tire 12 and provide tire ID which will be used to consult a database identifying the construction of the tire. Temperature of the tire and tire inflation pressure are also determined from tire-mounted sensors that transmit such information to a data processor (not shown) for tread wear analysis. The tire force and sliding velocity estimator 100 determines (Step 1) tire forces and sliding velocity from the estimation represented in FIG. 4. From the tire force and sliding velocity estimation, a tire frictional energy estimator 101 makes (Step 2) a fictional energy estimation. From the frictional energy estimation, a tire frictional work estimator 102 makes (Step 3) a frictional work estimation. The frictional work estimation is an input into a processor that also receives information from a GPS system. The GPS information include ambient weather condition, a road roughness determination and ambient temperature, all environmental factors that influence the abradability of rubber and, hence, the wear rate of a tire tread. From the tire frictional work estimation and the GPS information, a tire wear rate estimator 103 makes a tire wear rate estimation by consulting a database for the particular tire ID that correlates the tire frictional work estimate and GPS environmental conditions with a tire wear state. The database that the processor consults will conclude a tire wear state for the particular combination of estimated frictional work on the tire for the given GPS indicated environmental conditions. The tire wear information may be communicated through an in-dash display or by means of an operator's smartphone application.

From the foregoing, and with reference to FIG. 1, it will be seen that the subject tire wear state estimation system may be used to determine the wear rate for each tire supporting a vehicle. Each of the tires includes one or more tire-mounted device(s) operable to supply tire-specific information affecting tire contact patch dynamics and one or more inertial measurement unit(s) (handheld or vehicle sensor based from CAN-bus) operable to supply sliding velocity information from a tire contact patch formed by each tire rolling over a ground surface. Tire forces (F as determined in FIG. 4) and sliding velocity (V as measured by handheld or vehicle CAN-bus accessible sensors) are used to determine friction energy by application of the relationship (E=F*V). The friction energy calculated is the used by a friction work estimator to determine total friction work (L). The friction work estimator operates by integrating the friction energy (E) for each tire.

The determination of friction work (L), however is not determinative of tire wear rate alone for wear rate (W) is obtained by the dot product of friction work and abradability factors (Ab). Tire wear is proportional to the amount of frictional work performed by a tire but abradability factors (Ab) are taken into account by the invention to determine the quantitative correlation. The invention uses tire-based sensor information in combination with ambient abrasion factor information to determine the abradability factors (Ab). The tire characteristics affecting abrasion are determined by first identifying the tire by construction type from a tire-mounted tire ID mounted and electronically consulting a pre-generated database correlating the tire ID with construction information for the tire. Other tire characteristics such as tire inflation pressure and tire temperature are likewise obtained from tire-mounted sensors and such information is use with tire ID to determine specific tire abrasion factors for consideration.

In addition to the friction work determination 26 and the tire sensor-generated tire characteristics, the subject invention system uses ambient abradability information from a GPS system. The GPS system provides pavement characteristics, air and road temperature information and interfacial contaminant condition of the road. Such ambient abradability information is used with the tire abrasion characteristic information to generate abradability Ab used in calculating wear rate. Wear rate is thus determined by a dot product of the friction work calculation and the abradability Ab.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire wear state estimation system comprising:
a plurality of tires supporting a vehicle;
a plurality of tire-mounted devices provided on at least one tire of the plurality of tires operable to supply tire-specific contact dynamics information;
at least one inertial measurement unit operable to supply sliding velocity information from a tire contact patch formed by the at least one tire rolling over a ground surface;
an ambient condition monitoring system operable to supply ambient condition information;
a tire force and sliding velocity estimator operable to determine a tire force estimate and a tire sliding velocity estimate from the tire-specific contact dynamics information and the sliding velocity information;
a tire frictional energy estimator operable to estimate tire frictional energy from the tire force estimate and the tire sliding velocity estimate;
a tire frictional work estimator operable to determine a tire frictional work estimate from the tire frictional energy estimate; and
a tire wear rate estimator operable to generate a tire wear rate estimate from the tire frictional work estimate and the ambient condition information.

2. The tire wear state estimation system of claim 1, wherein the tire-mounted devices comprise:
at least one pressure-measuring sensor affixed to the at least one tire operable to supply by a data transmission measured tire inflation pressure data;
a tire identification transponder affixed to the at least one tire operable to supply by data transmission tire-specific identification data; and
a tire temperature sensor affixed to the at least one tire operable to supply by data transmission measured tire temperature data.

3. The tire wear state estimation system of claim 1, wherein the ambient condition information comprises at least one condition from the group consisting of ambient weather condition, road surface roughness and ambient temperature.

4. The tire wear state estimation system of claim 3, wherein the ambient condition monitoring system comprises a global positioning system operable to transmit the ambient condition information to the tire wear rate estimator.

5. The tire wear state estimation system of claim 1, wherein the inertial measurement unit comprises at least one vehicle-mounted and CAN-bus accessible sensor operable to make a three axes of rotation rate measurement and a three axes of acceleration measurement.

6. The tire wear state estimation system of claim 1, wherein the inertial measurement unit comprises a handheld phone equipped with an application program operable to make a three axes of rotation rate measurement and a three axes of acceleration measurement.

7. The tire wear state estimation system of claim 1, wherein the tire wear rate estimator operably generates the tire wear rate estimate from a correlation of the tire wear state to the frictional work estimate adjusted by a plurality of abrasion compensation parameters.

8. The tire wear estimation system of claim 7, wherein the abrasion compensation parameters include tire-specific construction characteristics, road-surface characteristics, ambient temperature characteristics, and road surface interfacial contaminant condition characteristics.

9. A tire wear state estimation system comprising:
a plurality of tires supporting a vehicle;
a plurality of tire-mounted devices provided on at least one tire of the plurality of tires operable to supply tire-specific information affecting tire contact patch dynamics;
at least one inertial measurement unit operable to supply sliding velocity information from a tire contact patch formed by the at least one tire rolling over a ground surface;
a friction work estimator operable to calculate a friction work estimate done by the at least one tire from the tire-specific information and the sliding velocity information;
a tire wear rate estimator operable to generate a tire wear rate estimation from drawing a proportional correlation between an abradability factor of the at least one tire and the calculated friction work estimate.

10. The tire wear state estimation system according to claim 9, wherein the tire wear rate estimator in generating the tire wear rate estimation operably employs externally supplied abrasion-impacting information influencing abrasion characteristics of at least one material composing the at least one tire.

11. The tire wear state estimation system according to claim 10, wherein the tire-specific information comprise at least one tire characteristic taken from the group consisting of tire inflation pressure, tire temperature, tire material composition hardness, tire material composition molecular structure, tire material composition elongation at break, tire material composition wear resistance, tire material composition degree of vulcanization, tire material composition carbon black content.

12. The tire wear state estimation system according to claim 10 wherein the abrasion-impacting information comprises at least one external characteristic taken from the group consisting of road surface smoothness, road surface grading condition, road surface composition, ambient air temperature, road surface temperature and presence of interfacial contaminants on the road surface.

13. The tire wear state estimation system of claim 9, wherein the friction work estimator includes a tire force estimator and sliding velocity estimator operable to respectively generate a tire force estimate and a sliding velocity estimate from the tire-specific information and the sliding velocity information.

14. A method of making a tire wear state estimation comprising:
supporting a vehicle by a plurality of tires;
mounting a plurality of tire-specific information-providing devices to at least one tire of the plurality of tires operable to supply tire-specific information affecting tire contact patch dynamics;
utilizing at least one inertial measurement unit to supply sliding velocity information from a tire contact patch formed by the at least one tire rolling over a ground surface;
employing a friction work estimator operable to calculate a friction work estimate done by the at least one tire from the tire-specific information and the sliding velocity information;
employing a tire wear rate estimator operable to generate a tire wear rate estimation from drawing a proportional correlation between an abradability factor of the at least one tire and the calculated friction work estimate.

15. The method of making a tire wear state estimation according to claim 14, further comprising:
   employing a tire force estimator operable to generate a tire force estimate for the tire contact patch; and
   employing a sliding velocity estimator operable to generate a sliding velocity estimate for the tire contact patch from the tire-specific information and the sliding velocity information.

16. The method of making a tire wear state estimation according to claim 14, further comprising using within the tire wear rate estimator externally supplied abrasion-impacting information influencing abrasion characteristics of at least one material composing the at least one tire.

17. The method of making a tire wear state estimation according to claim 16, wherein the tire-specific information comprises tire characteristics taken from the group consisting of tire inflation pressure, tire temperature, tire material composition hardness, tire material composition molecular structure, tire material composition elongation at break, tire material composition wear resistance, tire material composition degree of vulcanization, tire material composition carbon black content.

18. The method of making a tire wear state estimation according to claim 16 wherein the abrasion-impacting information comprises at least one external characteristic taken from the group consisting of road surface smoothness, road surface grading condition, road surface composition, ambient air temperature, road surface temperature, and presence of interfacial contaminants on the road surface.

\* \* \* \* \*